(12) United States Patent
Baker et al.

(10) Patent No.: US 12,669,340 B2
(45) Date of Patent: Jun. 30, 2026

(54) GENERATING LOCAL GRAPH DATA

(71) Applicant: Zoox, Inc., Foster City, CA (US)

(72) Inventors: Andrew Baker, North Hollywood, CA (US); Rasmus Fonseca, Boulder Creek, CA (US); Ravi Gogna, San Jose, CA (US); Joona Markus Petteri Kiiski, Cupertino, CA (US); Swapnil Vikas Mankar, Union City, CA (US); Mark Jonathon McClelland, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 147 days.

(21) Appl. No.: 18/647,820

(22) Filed: Apr. 26, 2024

(65) Prior Publication Data
US 2025/0334415 A1 Oct. 30, 2025

(51) Int. Cl.
G01C 21/34 (2006.01)
B60W 60/00 (2020.01)
(52) U.S. Cl.
CPC ..... G01C 21/3446 (2013.01); G01C 21/3453 (2013.01); B60W 60/001 (2020.02); B60W 2552/05 (2020.02); B60W 2552/10 (2020.02); B60W 2555/60 (2020.02); B60W 2556/40 (2020.02)
(58) Field of Classification Search
None
See application file for complete search history.

(56) References Cited

U.S. PATENT DOCUMENTS

| | | | | |
|---|---|---|---|---|
| 11,932,282 | B2 * | 3/2024 | Caldwell | ........... G05B 13/0265 |
| 2017/0366930 | A1 | 12/2017 | Treman et al. | |
| 2017/0370745 | A1 * | 12/2017 | Woolley | ................ G01C 21/36 |
| 2019/0324475 | A1 | 10/2019 | Dean et al. | |
| 2020/0232806 | A1 * | 7/2020 | Goldman | ............... G08G 1/167 |
| 2021/0107566 | A1 * | 4/2021 | Seegmiller | ......... G01C 21/3492 |
| 2022/0219720 | A1 * | 7/2022 | Hartnett | ............... G01C 21/367 |

(Continued)

FOREIGN PATENT DOCUMENTS

| | | |
|---|---|---|
| EP | 4234353 A1 | 8/2023 |
| KR | 20210015021 A | 2/2021 |

OTHER PUBLICATIONS

Search Report and Written Opinion for International Application No. PCT/US2025/025313, Dated Aug. 7, 2025, 12 pages.

*Primary Examiner* — Ryan Rink
(74) *Attorney, Agent, or Firm* — Lee & Hayes, P.C.

(57) ABSTRACT
Techniques for generating a local graph are described herein. A vehicle may receive a destination and generate a preferred path thereto. The vehicle may generate a local graph based on the preferred path which may define a subregion of the environment within which the vehicle may perform dynamic routing operations. For example, the vehicle may determine a local boundary which may define the subregion. Further, the vehicle may identify one or more junction(s) located within the local boundary and identify candidate (or alternative) driving lane(s) exiting such junction(s). The vehicle may generate a lane reference (e.g., optimized trajectory for the vehicle to follow to the destination) for each candidate driving lane. In such cases, the local boundary, the candidate driving lanes, and/or lane reference(s) may be data represented in the local graph. The vehicle may be controlled based on the local graph.

20 Claims, 6 Drawing Sheets

(56) References Cited

U.S. PATENT DOCUMENTS

| | | | | |
|---|---|---|---|---|
| 2023/0041975 A1* | 2/2023 | Caldwell | .......... | B60W 60/0027 |
| 2024/0067214 A1* | 2/2024 | Nagasaka | .......... | G01C 21/3691 |
| 2024/0317217 A1* | 9/2024 | Choi | ................ | B60W 60/0015 |
| 2024/0418515 A1* | 12/2024 | Wu | ......................... | G06F 40/40 |
| 2025/0002006 A1* | 1/2025 | Ogawa | ................... | G08G 1/143 |

* cited by examiner

600 ⟍

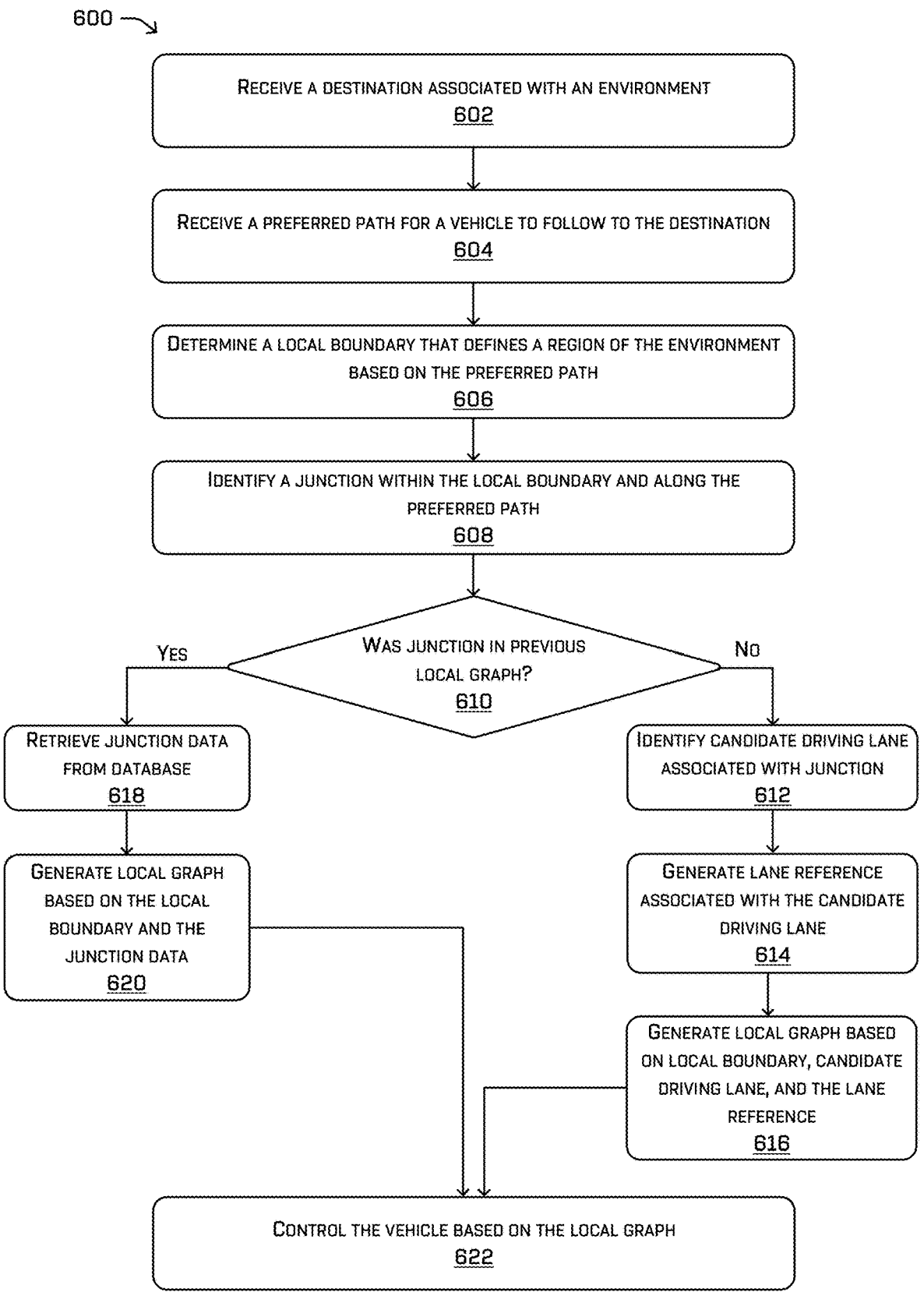

RECEIVE A DESTINATION ASSOCIATED WITH AN ENVIRONMENT
602

RECEIVE A PREFERRED PATH FOR A VEHICLE TO FOLLOW TO THE DESTINATION
604

DETERMINE A LOCAL BOUNDARY THAT DEFINES A REGION OF THE ENVIRONMENT
BASED ON THE PREFERRED PATH
606

IDENTIFY A JUNCTION WITHIN THE LOCAL BOUNDARY AND ALONG THE
PREFERRED PATH
608

WAS JUNCTION IN PREVIOUS
LOCAL GRAPH?
610

YES

NO

RETRIEVE JUNCTION DATA
FROM DATABASE
618

IDENTIFY CANDIDATE DRIVING LANE
ASSOCIATED WITH JUNCTION
612

GENERATE LOCAL GRAPH
BASED ON THE LOCAL
BOUNDARY AND THE
JUNCTION DATA
620

GENERATE LANE REFERENCE
ASSOCIATED WITH THE CANDIDATE
DRIVING LANE
614

GENERATE LOCAL GRAPH BASED
ON LOCAL BOUNDARY, CANDIDATE
DRIVING LANE, AND THE LANE
REFERENCE
616

CONTROL THE VEHICLE BASED ON THE LOCAL GRAPH
622

FIG. 6

GENERATING LOCAL GRAPH DATA

BACKGROUND

Vehicles, such as autonomous vehicles, may navigate along a designated route. In some examples, autonomous vehicles may encounter various types of static and/or dynamic objects as well as traffic, construction zones, and the like. Such vehicles need to be able to respond appropriately when encountering such varied environments and situations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 is a flow diagram illustrating an example process for receiving a destination, receiving a preferred path based on the destination, determining a boundary, identifying a junction within the boundary, generating lane reference(s) for driving lane(s) associated with the junction, generating a local graph based on the horizon, driving lane(s), and/or the lane reference(s), and/or controlling the vehicle based on the local graph, in accordance with one or more examples of the disclosure.

DETAILED DESCRIPTION

Figure 1:
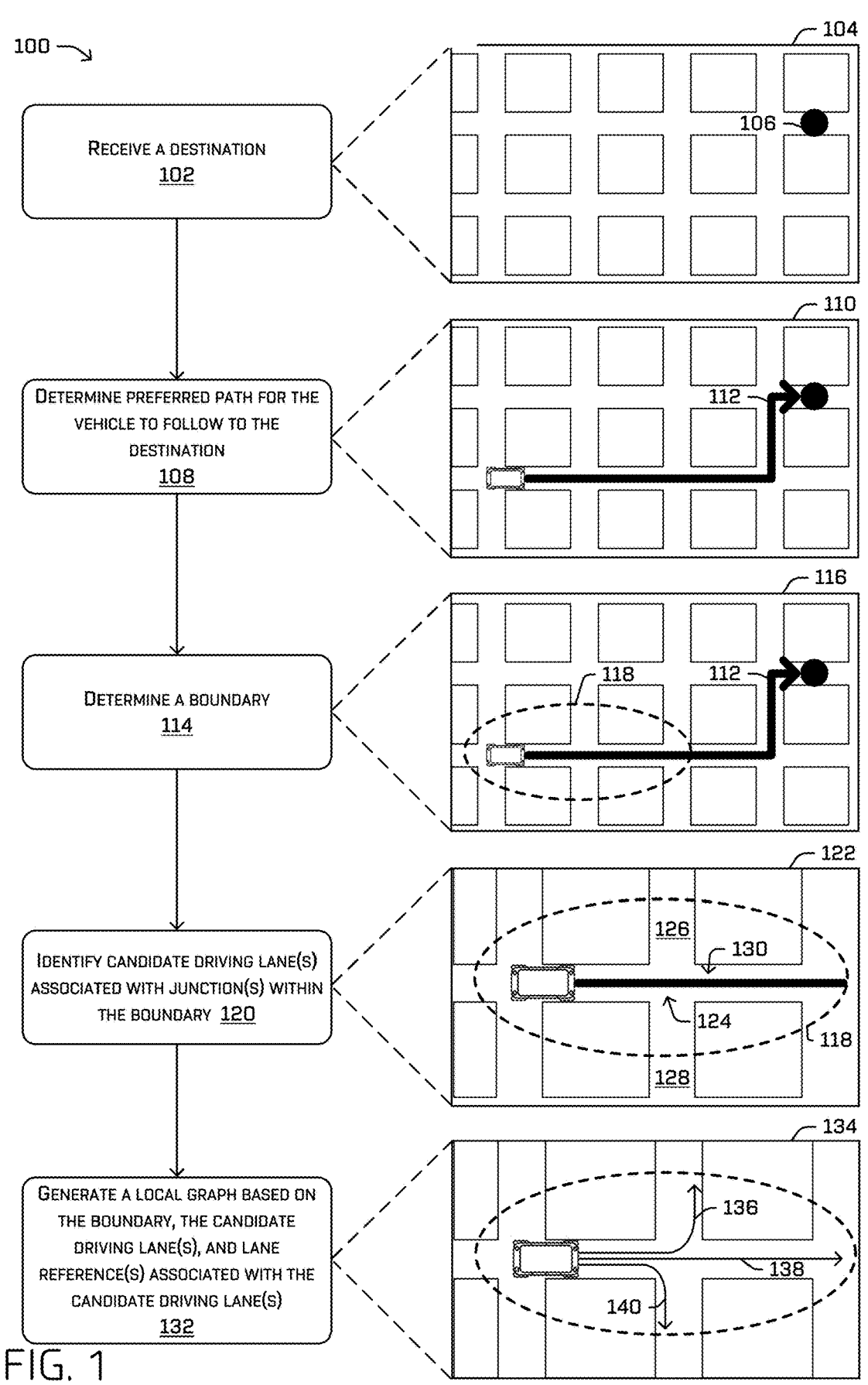
FIG. 1 is a pictorial flow diagram illustrating an example technique for generating local graph data, in accordance with one or more examples of the disclosure.

Techniques for generating a local graph (e.g., bounded region of an environment including various types of data) are described herein. As described below, prediction and/or planning systems may use a local graph to perform various operations. In some examples, a vehicle (such as an autonomous vehicle) may receive a destination representing a location to which the vehicle is to navigate. The vehicle may generate a path (e.g., a spatial representation of a route to the destination, covers one or more laterally adjacent driving lanes, etc.) to the destination. In some examples, the vehicle may generate a local graph (e.g., a portion of a graph and/or an incomplete graph which may be complete in a subregion, defined herein) based on the preferred path which may define a subregion of the environment within which the vehicle may perform dynamic routing operations. For example, the vehicle may determine a local boundary which may define the subregion (e.g., a fixed distance (e.g., 100 m) and/or temporal (e.g., 8 s) boundary of potential areas the vehicle is capable of reaching within that boundary, a defined area relative to the vehicle, or the like). Further, the vehicle may identify one or more junction(s) located within the boundary or subregion, and may identify candidate (or alternative) driving lane(s) exiting such junction(s). In such cases, the vehicle may generate a lane reference (e.g., optimized trajectory for the vehicle to follow to the destination) for each candidate driving lane. In such cases, the local boundary, the candidate driving lanes, and/or lane reference(s) may be data represented in the local graph. The vehicle may be controlled based at least in part on the local graph. As described in more detail below, the techniques described herein may improve vehicle safety and driving efficiency by enabling dynamic routing and increasing the ability of the vehicle to continue navigating to a destination despite encountering blockages, obstacles, etc., thereby allowing the vehicle to perform more efficient driving maneuvers.

When instructing a vehicle through an environment, it may be beneficial to enable the systems of the vehicle to include dynamic routing functionality. For example, systems of a vehicle may determine routing information when the vehicle starts navigating to a destination. The routing information may include a single, fixed route (e.g., high level representation of the road network) that the vehicle is to follow and which extends from the current location of the vehicle to the destination. However, in some cases, the vehicle may determine that the fixed route may be suboptimal and/or inefficient. For instance, the single route may instruct the vehicle to perform a right turn upon entering a junction; however, due to the vehicle failing to perform a timely lane change into the right-most driving lane, the vehicle may be unable to perform the right turn in the junction. Similarly, the planned path may comprise blockages (e.g., construction, double parked vehicles, etc.) such that an alternate path is necessary to achieve a driving goal. Accordingly, in these situations, conventional systems may lack capabilities to dynamically determine updated routes for the vehicle to continue navigating to the destination. In this example, the vehicle may be required to restart the planning component and/or restart the navigation mission. As such, the systems and/or techniques described herein may enable vehicle systems to dynamically determine and/or update alternative paths to the destination.

To address these and other technical problems and inefficiencies, the system and/or techniques described herein include a planning component (which also may be referred to as a "planning system" or "planner component") configured to generate a local graph that includes data regarding candidate (or alternative) paths the vehicle can follow that are different than the preferred path. Technical solutions discussed herein solve one or more technical problems associated with existing routing techniques which can result in suboptimal vehicle actions.

In some examples, the planning component may receive a destination associated with a region of the environment. The vehicle may receive instruction(s) (e.g., transport passenger(s), deliver item(s), etc.) to navigate from a starting location to an ending location (or destination). Such instruction(s) may be received from a fleet management system, a remote operating system, a passenger or a passenger device, a future passenger, and/or any other source. In some examples, a destination may be a location within the environment to which the vehicle is to navigate. That is, the instructions may include a location (e.g., x-y coordinate, street address, etc.) within the environment associated with a destination.

Based on receiving the destination, the planning component may determine the shortest path (or lowest cost path, candidate path, etc.) from some or all positions in the environment to the destination. The planning component may generate the lowest cost path during the vehicle startup phase. The startup phase may be a moment in which the vehicle turns on, initializes, etc. That is, the planning component may solve for (or otherwise determine) the lowest cost path to the destination for each position (or a subset of positions) in the environment. A path may be a spatial representation of potential movements of the vehicle. The path may span one or more longitudinally connected road segments (e.g., multiple driving lanes of the same length traveling in the same direction). In some examples, the planning component may receive map data and identify the destination within the map data. Further, for every location in the map data, the planning component may compute the lowest cost path from the location to the destination. For example, the locations may include starting and/or ending locations of road segments, driving lanes, lane segments, etc. The planning component may determine the lowest cost path using one or more shortest path algorithms such as Dijkstra's Algorithm, A*, D*, etc. The lowest cost may be determined based on a time to get to the destination based on speed limit data associated with the driving lanes leading to the destination. That is, the planning component may determine a cost associated with the lowest cost path (or candidate path) that is based on how long it takes to get to the destination based on following the path and based on speed limit data. The cost data may be stored with the candidate path (or the lowest cost path). Accordingly, upon performing the shortest path algorithm for each location in the map data, the planning component may store such paths in a database associated with the vehicle or in an in memory data structure that is accessible to the vehicle. The database or data structure may be accessible to the vehicle such that the vehicle can retrieve one or more of the paths stored therein while navigating the environment.

In some examples, the planning component may determine a preferred path for the vehicle to follow to the destination. That is, the planning component may access the database containing the lowest cost paths (described above) and retrieved a preferred path for the vehicle. A preferred path may be a lowest cost path (or shortest path) from the location of the vehicle to the destination. In some cases, the planning component may determine a location of the vehicle based on vehicle position data and retrieve, from the database or other in memory data structure, the lowest cost path from the location of the vehicle to the destination. The path retrieved from the database or in memory data structure may be considered the preferred path. For example, the planning component may determine that the vehicle is located at a position in the environment. In this case, the planning component may access the database (or data structure) and identify the lowest cost path that starts at the position of the vehicle. Based on identifying the lowest cost path, the planning component may receive the path and tag or otherwise indicate that path is the preferred path of the vehicle.

As described in more detail below, the planning component may generate a local graph based on the preferred path. That is, the planning component may use the preferred path to generate a subregion of the environment within which the planning component may evaluate for dynamic routing. As noted below, the local graph may be defined by a local boundary and include one or more junctions (located in the local boundary), candidate driving lanes associated with the junctions (located in the local boundary), shortest paths (or lowest cost paths) associated with the candidate driving lanes, and/or lane references following the shortest paths to the destination.

For example, when generating the local graph, the planning component may determine a boundary for the local graph. The boundary (or local boundary, local search boundary, etc.) may represent the region within the environment that the planning component may evaluate for dynamic routing. The boundary may define the bounds that expand a distance along the preferred path in front of the vehicle and a distance along the preferred path behind the vehicle. That is, the boundary may encompass the vehicle. The purpose of defining the boundary to encompass the vehicle is to allow remote operating systems to be able to guide or otherwise instruct the vehicle through the environment in situations in which the vehicle is to reverse. In some examples, the distance in front of the vehicle and/or the distance behind the vehicle may be static (or predefined). For example, the planning component may receive data indicating that the boundary may extend 250 meters in front of the vehicle and 30 meters behind the vehicle. Of course, in other examples, the distance(s) may be the same or different (e.g., larger or smaller). Alternatively, the distance(s) may be dynamically determined (e.g., the distance(s) are modified or updated while the vehicle navigates the environment). For example, the planning component may determine an updated size and/or dimension of the boundary based on one or more factors. Such factors may include a speed limit of the road segment, driving lane, etc. or a type of the driving lane (e.g., freeway (e.g., larger distances), inner city (e.g., smaller distances), etc.).

Upon determining the boundary (or local boundary), the planning component may identify one or more junctions (or intersections) that are located within the boundary and along the preferred path. A junction (or intersection) may be a location where two or more driving lane(s) (or road segments, lane segments, etc.) intersect or diverge. The planning component may identify the junction(s) within the boundary by accessing map data associated with the environment within the boundary and identifying one or more junctions. In some cases, the map data may tag or otherwise indicate the junctions within the map data. As such, the planning component may identify the junctions based on the tagged map data.

In some examples, the planning component may identify some or all candidate (or alternative) driving lanes associated with the junction. That is, based on identifying the junction, the planning component may identify the driving lanes that exit the junction. For example, if the junction is a four-way junction, the planning component may identify the three other driving lanes that exit the junction as the candidate driving lanes. The planning component may identify the candidate driving lanes by accessing and/or analyzing the map data.

Based on identifying the candidate driving lanes for the junction(s) within the boundary, the planning component may receive (or determine) the lowest cost path from the candidate driving lane to the destination. That is, the planning component may use or otherwise access the database or the in memory data structure described above to retrieve the lowest cost paths for the candidate driving lanes. In such cases, the planning component may identify a position within the environment that the driving lane (or road segment associated with the candidate driving lane) starts (or exists the junction). Based on identifying the position of the driving lane, the planning component may access the database or the data structure and identify the lowest cost path that starts at the same location as the position of the driving lane. The planning component may perform such operations for some or all driving lanes within the boundary. For example, if the junction includes two candidate driving lanes, the planning component may identify a first location for the first candidate driving lane and a second location of the second driving lane. The planning component may use the first location to retrieve a first lowest cost path for the first candidate driving lane and use the second location to retrieve a second lowest cost path for the second candidate driving lane.

Based on receiving the lowest cost path(s) for the candidate driving lane(s), the planning component may generate a lane reference (or candidate path) along the lowest cost path (or path) that extends from the start of the candidate driving lane to the destination. That is, based on identifying a lowest cost path for all of the candidate driving lanes, the planning component may determine a lane reference along each of the lowest cost paths. A lane reference may be an optimized trajectory (e.g., includes spatial, temporal, and kinematic data) that the vehicle may follow. In some examples, the planning component may use one or more machine-learning models to generate the lane reference(s). The machine-learning model may receive, as input, road segment data, driving lane data, lane segment data, etc. and output a lane reference. Examples of various techniques for generating lane reference(s) for autonomous vehicles can be found, for example, in U.S. Pat. No. 11,932,282, filed on Aug. 4, 2021, and titled, "Vehicle Trajectory Control Using a Tree Search," and in U.S. patent application Ser. No. 18/540,642, filed on Dec. 14, 2023, and titled, "Machine-Learned Cost Estimation in Tree Search Trajectory Generation for Vehicle Control," which is incorporated by reference herein in its entirety. In such cases, the planning component may store the lane references with the associated driving lane.

In some examples, the planning component may generate the local graph based on the boundary, the junction(s), the candidate driving lane(s), the lowest cost path(s), and/or the lane reference(s). Based on generating the local graph, the planning component may control the vehicle based on the local graph. That is, upon generating the local graph, the planning component may send the local graph to one or more downstream prediction and/or planning components which may use and/or build upon the data stored in or otherwise associated with the local graph. As such, such systems may use the local graph to generate actions for the vehicle to follow which may result in the vehicle being controlled based on the local graph. For example, the planning component may determine that the vehicle is unable to continue following the preferred path based on the presence of an obstruction (e.g., road blockage, construction, full parking space, etc.). In such cases, the planning component may determine (or otherwise select) one of the candidate driving lanes, lowest cost paths, and/or lane references to follow as an alternative to the preferred path. The planning component may determine which of the candidate driving lanes to follow based on a temporal cost that evaluates the time to travel to the destination based on speed limit data of the candidate driving lanes leading to the destination. As such, upon identifying the candidate driving lane with the lowest cost, the planning component may control the vehicle accordingly.

Alternatively or additionally, the planning component may update or shift the boundary as the vehicle moves throughout the environment. That is, the planning component may generate a first instance of the local graph during the vehicle startup phase. Further, the planning component may update the local graph (and the data (e.g., boundary, junction(s), candidate driving lane(s), lowest cost path(s), lane reference(s), etc.) associated therewith) while the vehicle traverses the environment according to an operating tick of the planning component. An operating tick may be a frequency (e.g., 1 millisecond, 5 milliseconds, etc.) and/or duration of a processing cycle within the planning component. As such, in some examples, the planning component may update the local graph at each operating tick. However, in other examples, the local graph may be updated at any other suitable frequency (e.g., every N number of ticks, where N is an integer greater than zero, based on movement of the vehicle, velocity of the vehicle, number of additional objects proximate the vehicle, difficulty of maneuvers, proximity to the endpoint, etc.). As such, an updated local graph may span a different region of the environment than a previous version of the local graph based on the movement of the vehicle.

In some examples, when generating the updated or shifted local graph, the planning component may recompute the entire graph or the planning component may compute the portions of the local graph that are new to boundary. That is, in some cases, the planning component may store previous versions of the local graph in databases and/or caches associated with the vehicle. Accordingly, when updating the local graph, the planning component may identify a junction within the updated boundary and determine whether the junction is new within the boundary or if the junction was also within the previous local graph. If the junction is located in the previous local graph, the planning component may retrieve, from the database or cache, the data associated with the junction (e.g., driving lane data, candidate path data, lane reference data, etc.) such that the planning component does not need to recompute the data for a second or more time. In contrast, if the junction is not located within a previous version, the planning component may perform the techniques described above.

The techniques described herein can improve the functioning, safety, and efficiency of the autonomous and semi-autonomous vehicles operating in various environments. Generating local graph data may increase the ability of vehicle systems to select and/or determine efficient driving maneuvers for the vehicle. Further, generating the local graph data may increase the ability of the vehicle to dynamically route the vehicle which may save processing power when the vehicle gets stuck or is otherwise unable to progress in the environment. The ability of the vehicle to perform dynamic routing may allow the vehicle to perform safer and/or more efficient driving maneuvers.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for generating local graph data. As shown in this example, some or all of the operations in the example process 100 may be performed by a perception component, prediction component, a planning component, and/or any other component or systems within an autonomous vehicle. As described below in more detail, the planning component may include various components, such as a path generating component, a preferred path component, a boundary determining component, a junction identifying component, a lane identifying component, and/or a reference generating component.

At operation 102, the planning component may receive a destination. In some examples, the planning component may receive instruction(s) that include a coordinate in the environment representing a destination to which the vehicle is to navigate. For example, box 104 illustrates a destination 106 within an environment. In this example, the environment may be a gridded environment that includes multiple driving lanes. As shown, the box 104 may include a destination 106 located within the environment. In this example, the destination 106 may be located within a driving lane; however, in other examples, the destination 106 may be the location of a building, a parking space, etc.

At operation 108, the planning component may determine a preferred path for the vehicle to follow to the destination. In some examples, the planning component may determine lowest cost paths from some or all locations in the environment. That is, the planning component may receive map data and determine, for some or all locations in the map data, the lowest cost path (e.g., Dijkstra's Algorithm (or any other shortest path technique)) to the destination. In such cases, the planning component may store all of the lowest cost paths and the associated starting locations in a database or other in memory data structures. Accordingly, when determining the preferred path of the vehicle, the planning component may determine a location of the vehicle and access the database or the data structure to identify the lowest cost path that starts from the same or similar location as the location of the vehicle. The planning component may determine that the identified path may be the preferred path. For example, box 110 illustrates a vehicle with a preferred path 112. In this example, the preferred path 112 may be the lowest cost path for the vehicle to follow to the destination 106.

At operation 114, the planning component may determine a local boundary that may represent the boundary of the local graph. The boundary may include predefined distances or in other examples, the boundary may be determined by the planning component. That is, in some examples, one or more systems of the vehicle may send a distance the boundary is to extend in front of the vehicle and along the preferred path 112 and a distance the boundary is to extend behind the vehicle and along the preferred path 112. In other examples, the planning component may determine the distance(s) based on speed limit data and/or road type data. For example, box 116 illustrates a local boundary encompassing the vehicle. In this example, the boundary 118 may be a circular shape; however, in other examples, the boundary 118 may be any other type of shape (e.g., square, rectangular, etc.). As shown, the vehicle may be encompassed by boundary 118. Further, the boundary 118 may extend a larger distance in front of the vehicle than the distance behind the vehicle.

At operation 120, the planning component may identify candidate driving lane(s) associated with junction(s) within the boundary 118. That is, the planning component may identify one or more junctions within the local boundary (e.g., determined at operation 114). The planning component may access the map data and identify the junction(s) that are located within the boundary. Further, based on identifying the junction, the planning component may identify the candidate (or alternative) driving lanes that exit (or are otherwise associated with) the junction(s). For example, box 122 illustrates a junction and candidate driving lanes within the boundary. In this example, the planning component may identify the junction 124 as the junction that is located in the boundary. As shown, the junction 124 may include a candidate driving lane 126, a candidate driving lane 128, and a candidate driving lane 130. Of course, this is not to be limiting; in other examples, the junction 124 may include more or fewer candidate driving lanes that extend from the junction 124.

At operation 132, the planning component may generate a local graph based on the boundary, the candidate driving lane(s), and the lane reference(s) associated with the candidate driving lane(s). That is, the planning component may generate lane references that follow the candidate driving lanes and extend to the destination 106. In some examples, the planning component may identify a lowest cost path from the candidate driving lane to the destination 106 based on retrieving the lowest cost path from the database or from the data structure, as described above. That is, the planning component may utilize the candidate driving lane data and identify the lowest cost path in the database or in the data structure that corresponds to the same or similar location as the candidate driving lane. Upon identifying the lowest cost path to the destination 106 for a specific driving lane, the planning component may generate a lane reference to the destination that follows the lowest cost path. For example, box 134 illustrates lane references that follow the candidate driving lanes to the destination 106. In this example, the box 134 may include a lane reference 136 that follows the lowest cost path (not shown) for the candidate driving lane 126, a lane reference 138 that follows the lowest cost path (not shown) for the candidate driving lane 130, and a lane reference 140 that follows the lowest cost path (not shown) for the candidate driving lane 128. In this example, the planning component may include the boundary 118, the junction 124, the candidate driving lanes, and/or the lane references in the local graph. In such cases, the planning component may send the local graph to downstream prediction and/or planning components which may use the local graph in further analysis.

Figure 2:
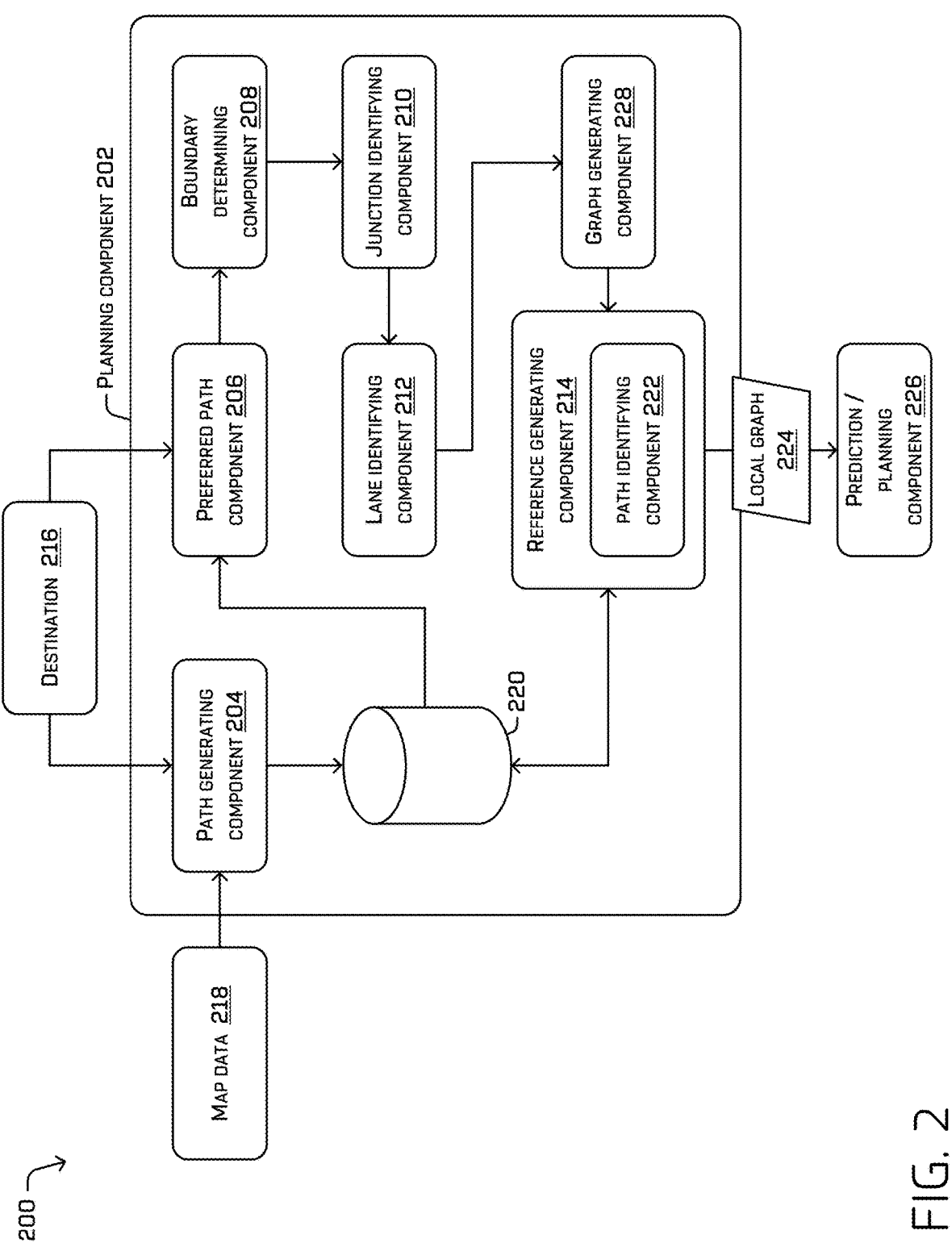
FIG. 2 illustrates an example computing system including a planning component configured to generating a local graph which may be used by systems of a vehicle while navigating through an environment, in accordance with one or more examples of the disclosure.

FIG. 2 illustrates an example computing system 200 including a planning component 202 configured to generating a local graph which may be used by systems of a vehicle while navigating through an environment.

In some examples, the planning component 202 may be similar or identical to the planning component described above, or in any other examples herein. As noted above, in some cases the planning component 202 may be implemented within an autonomous vehicle. In some examples, the planning component 202 may include various components, described below, configured to perform different functionalities of a technique to generate local graphs accessible to autonomous vehicles. In some examples, the planning component 202 may include a path generating component 204 configured to generate one or more lowest cost paths to a destination, a preferred path component 206 configured to receive (or determine) a preferred path for the vehicle to follow to the destination, a boundary determining component 208 configured to determine a local boundary for the local graph, a junction identifying component 210 configured to identify one or more junctions within the local boundary, a lane identifying component 212 configured to identify one or more candidate (or alternative) driving lanes that are associated with the junction(s), and/or a reference generating component 214 configured to generate lane references associated with the candidate driving lanes.

In some examples, the planning component 202 may receive a destination 216 to which the vehicle is to travel. The planning component 202 may receive the destination 216 from one or more computing systems of the vehicle and/or from one or more external systems. The destination 216 may include an x-y coordinate (e.g., global coordinate frame or local coordinate frame) representing the location of the destination 216 within the environment. The destination 216 may be sent to the path generating component 204 and/or the preferred path component 206.

In some examples, the planning component 202 may receive map data 218 based on the destination 216. The planning component 202 may receive map data 218 of the region of the environment between the starting location of the vehicle and the destination 216. In some examples, the planning component 202 may receive the map data 218 from an external map server, and/or may store the map data 218 in an internal storage. For instance, the autonomous vehicle may request a receive map data 218 from a remote map server, based on the destination 216 to which the vehicle is to travel, and store one or more maps locally on the vehicle. In some examples, map data 218 can include any number of data structures, modeled in two or more dimensions that are capable of providing information about the environment, such as, but not limited to, road network data, topologies, intersections (or junctions), streets, roads (or driving lanes), terrain, and the environment in general. The map data 218 may also represent various map features within the environment along the route, including but not limited to roads, lanes, curbs, shoulders, crosswalks, buildings, medians, street signs, traffic signs, speed limits, etc. In some examples, the map data 218 may be sent to the path generating component 204 within the planning component 202. Though shown that the path generating component 204 receives the map data 218, in other examples any other component of the planning component 202 may receive the map data 218.

In some examples, the planning component 202 may include a path generating component 204 configured to generate one or more lowest cost paths to a destination. The path generating component 204 may receive the map data 218 and the destination 216. In some examples, the path generating component 204 may perform a complete Dijkstra's Algorithm operation on the map data 218 with respect to the destination 216. That is, the path generating component 204 may identify the lowest cost path to the destination 216 from every location (or a subset of locations) within the map data 218 based on a time to arrive at the destination based on speed limit data associated with the one or more driving lanes leading to the destination. Accordingly, the path generating component 204 may determine a cost associated with the candidate paths that lead to the destination. In such cases, the candidate path with the lowest cost may be stored in association with the a database or in a data structure. Based on identifying the lowest cost paths for some or all locations in the map data 218, the path generating component 204 may store the lowest cost paths in a database 220 or in a data structure that is accessible to the vehicle. That is, though FIG. 2 illustrates storing the lowest cost paths in the database 220, in other examples, the path generating component may store the lowest cost paths in an in memory data structure. For example, the path generating component 204 may store a lowest cost path with a starting location of the path and/or a driving lane. In such cases, the database 220 or the data structure may include multiple lowest cost paths that correspond to specific starting locations (e.g., coordinates (x-y coordinate), driving lanes, road segments, lane segments, etc.) in the environment. As shown in FIG. 2 and as described below, one or more components of the planning component 202 may access the database 220 or the data structure to retrieve a lowest cost path from a specific location in the environment.

In some examples, the planning component 202 may include a preferred path component 206 configured to receive (or determine) a preferred path for the vehicle to follow to the destination. The preferred path component 206 may receive the destination 216 and/or the map data 218. In some examples, the preferred path component 206 may identify, determine, or otherwise receive the lowest cost path extending from the location of the vehicle to the destination 216. In such cases, the preferred path component 206 may determine a location of the vehicle within the environment. The location may be represented by a x-y coordinate, a lane segment, a driving lane, a road segment, etc. In such cases, the preferred path component 206 may access the database 220 and identify the lowest cost path stored therein that corresponds to the location of the vehicle. Upon identifying the lowest cost path, the preferred path component 206 may determine that the path is the preferred path of the vehicle. However, this is not intended to be limiting; in other examples, the preferred path component 206 may determine the preferred path by directly performing a lowest cost path algorithm from the location of the vehicle to the destination 216.

In some examples, the planning component 202 may include a boundary determining component 208 configured to determine a local boundary for the local graph. The boundary determining component 208 may determine a local boundary that encompasses (or covers) a region of the environment that is less than the entire distance between the vehicle and the destination 216. In some cases, the boundary determining component 208 may determine the local boundary by receiving a predefined distance (e.g., 250 meters, 350 meters, etc.) that boundary is to extend along the preferred path in front of the vehicle and a predefined distance (e.g., 10 meters, 20 meters, etc.) that the boundary is to extend along the preferred path behind the vehicle. However, in other examples, the boundary determining component 208 may determine the boundary by analyzing the speed limit data of the road network and/or a type of road the vehicle is navigating on.

In some examples, the planning component 202 may include a junction identifying component 210 configured to identify one or more junctions within the local boundary. The junction identifying component 210 may receive the preferred path, the local boundary, map data 218, etc. In some cases, the junction identifying component 210 may utilize the map data 218 to determine whether there are any junction(s) within the local boundary. The map data 218 may indicate junctions based on annotations and/or tags within the map data 218. As such, the junction identifying component 210 may identify one or more junctions that are located with the local boundary.

In some examples, the planning component 202 may include a lane identifying component 212 configured to identify one or more candidate (or alternative) driving lanes that are associated with the junction(s). The lane identifying component 212 may receive the preferred path, the local boundary, map data 218, the junctions, etc. In some cases, the lane identifying component 212 may utilize the map data 218 to identify the one or more candidate driving lanes (or road segments, lane segments, etc.) that exit the junction(s)

identified by the junction identifying component 210. The lane identifying component 212 may access the map data 218 and identify the candidate driving lanes that extend from the junction(s).

In some examples, the planning component 202 may include a graph generating component 228 that may be configured to generate a local graph. The graph generating component 228 may receive the boundary, the candidate driving lanes located therein, the junctions located therein, etc. In such cases, the graph generating component 228 may generate a graph that incorporates the boundary, the candidate driving lanes (and/or road segments, lane segments, etc.), the preferred path, cost data, etc. In such cases, the graph generating component 228 may send the graph to the reference generating component 214 which may generate and/or store (with the graph) one or more lane reference(s) associated with the candidate driving lanes determined above.

In some examples, the planning component 202 may include a reference generating component 214 configured to generate lane references associated with the candidate driving lanes. The reference generating component 214 may receive the graph from the graph generating component 228. As shown, the reference generating component 214 may include a path identifying component 222. That is, for the reference generating component 214 to know where to generate the lane reference, the reference generating component 214 may identify a path to use as a reference. For instance, the path identifying component 222 may be configured to identify (or receive) a lowest cost path from the candidate driving lane(s) to the destination 216. As such, the path identifying component 222 may identify a location of the candidate driving lane and use the location to access the database 220. In such cases, the path identifying component 222 may identify the lowest cost path stored therein that is associated with the location and associate the path with the candidate driving lane. Accordingly, the reference generating component 214 may generate a lane reference (e.g., optimized trajectory) along the path to the destination. That is, the reference generating component 214 may generate a trajectory that extends to the destination 216. In some examples, the lane reference (or trajectory) may be stored in the graph (or local graph).

In some examples, the reference generating component 214 may send the local graph 224 to a prediction and/or planning component 226. That is, the reference generating component 214 may send the local graph 224 to one or more downstream systems that may utilize the local graph 224 to perform various operations to control the vehicle.

Figure 3:
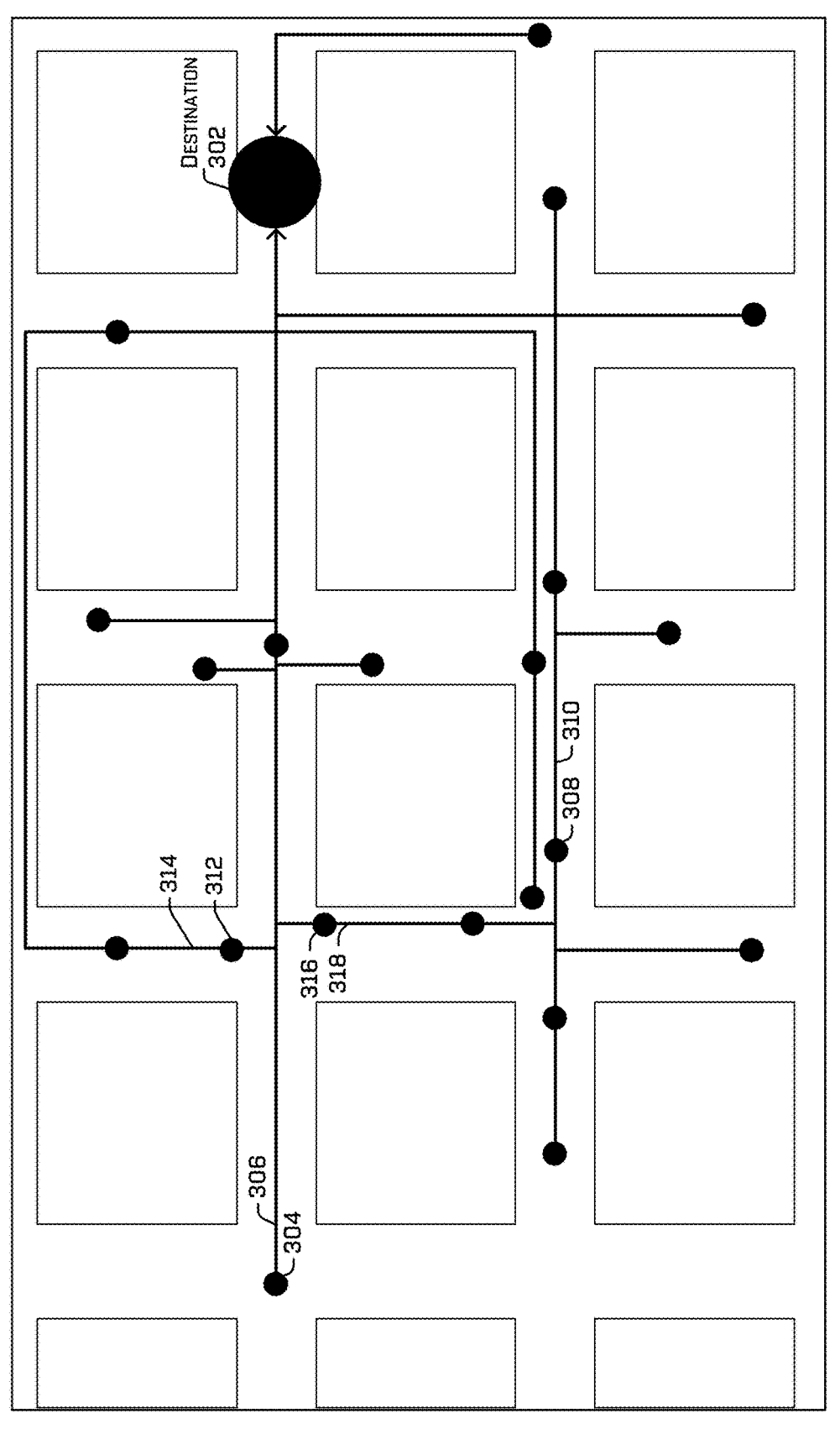
FIG. 3 depicts an example environment that includes lowest cost paths from multiple locations within an environment to a destination, in accordance with one or more examples of the disclosure.

FIG. 3 depicts an example environment 300 that includes lowest cost paths from multiple locations within an environment to a destination. Specifically, FIG. 3 illustrates determining the lowest cost path to the destination from any location within the environment.

In this example, the example environment 300 may include a gridded road network. That is, the example environment 300 may include multiple driving lanes that intersect with one another and connect in a grid-like network. As shown, the example environment 300 may include a destination 302. That is, the destination 302 may represent a location in the environment to which a vehicle is to navigate. Based on receiving the destination 302, the vehicle (or systems associated thereto) may determine the lowest cost paths from some or all locations within the environment with respect to the destination 302. For example, the example environment 300 may include multiple black dots which may represent locations in the environment. Further, the example environment 300 may include lines that may represent the lowest cost path to get to the destination 302 starting from the black dot. For instance, the example environment 300 may include a location 304 and a path 306 that represents the lowest cost path to get from the location 304 to the destination 302. Further, the example environment 300 may include a location 308 and a path 310 that represents the lowest cost path to get from the location 308 to the destination 302. As shown, the example environment 300 may include a location 312 and a path 314 that represents the lowest cost path to get from the location 312 to the destination 302. The example environment 300 may include a location 316 and a path 318 that represents the lowest cost path to get to the destination 302. Based on determining the lowest cost paths from some or all locations within the environment, the vehicle may store the lowest cost paths with the associated location in a database or in an in memory data structure. That is, the data may be stored as a location-path pair. In such examples, the database may contain the lowest cost path to a destination from any location in the environment. As such, the vehicle may access the database while navigating the environment to determine path data associated with candidate driving lanes.

Figure 4:
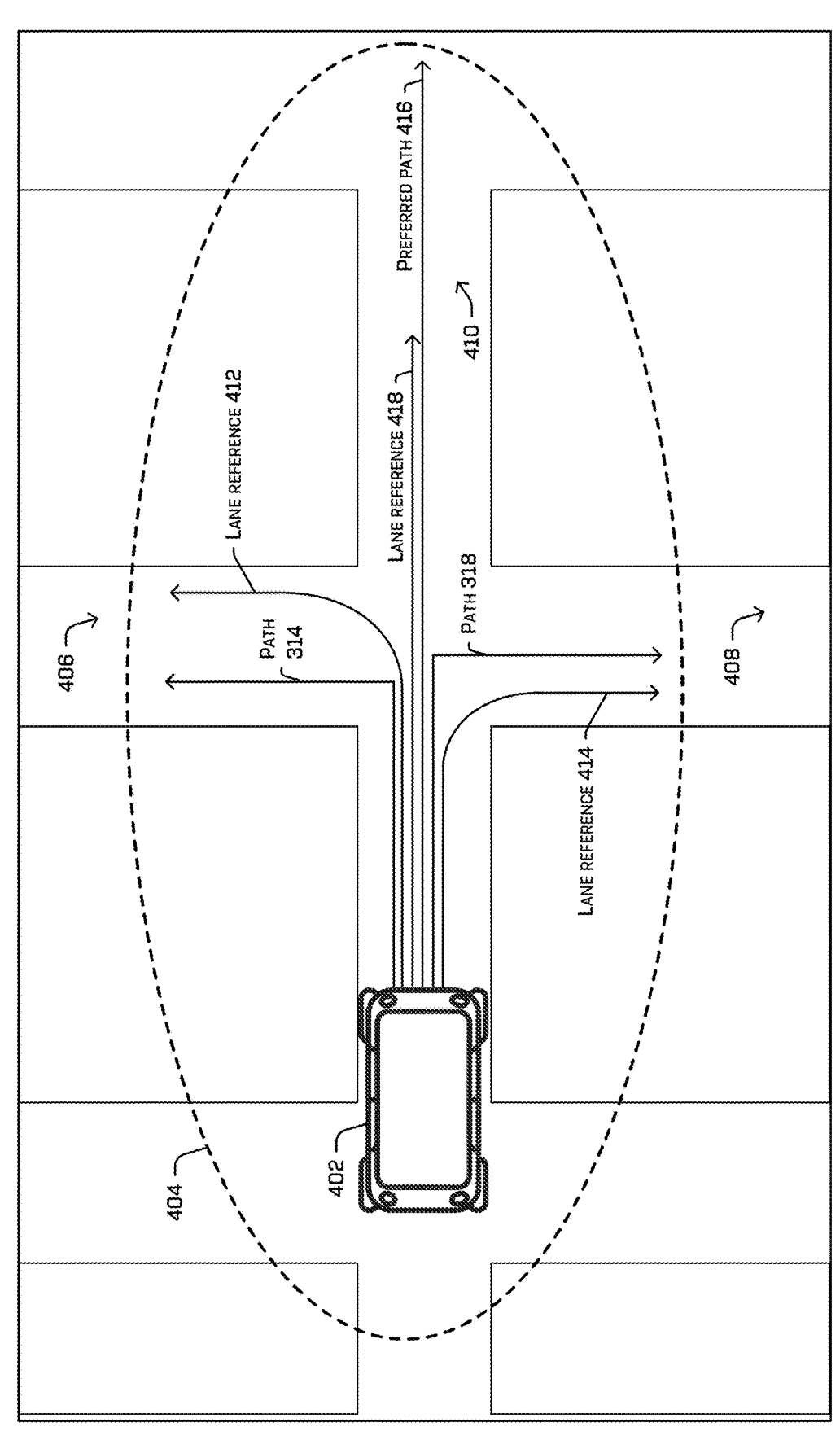
FIG. 4 depicts an example environment that includes a local graph with driving lanes, paths, and lane references, in accordance with one or more examples of the disclosure.

FIG. 4 depicts an example environment 400 that includes a local graph with driving lanes, paths, and lane references.

In this example, the example environment 400 may illustrate a local graph. The example environment 400 may include a vehicle 402 navigating to a destination (not shown). As shown, the vehicle 402 may be encompassed within a local boundary 404 of the local graph. The local boundary 404 may be similar or the same as the local boundary described above and below. In this example, the local boundary 404 may extend a distance in front of the vehicle 402 and a distance behind the vehicle 402.

In this example, the example environment 400 may include multiple lowest cost paths to the destination and multiple lane references extending to the destination. That is, the vehicle may identify a candidate driving lane 406, a candidate driving lane 408, and a candidate driving lane 410 that extend from the junction. In this case, the vehicle may identify a lowest cost path from the candidate driving lane 406 to the destination and generate a lane reference from the candidate driving lane 406 to the destination based on the lowest cost path. That is, path 314 (as indicated in FIG. 3) may represent the lowest cost path from the candidate driving lane 406 to the destination. Based on the path 314, the vehicle may generate a lane reference 412 (e.g., optimized trajectory) that extends from the candidate driving lane 406 to the destination. That is, the lane reference 412 may be the optimized trajectory that extends to the destination. Further, the vehicle 402 may identify a lowest cost path from the candidate driving lane 408 to the destination and generate a lane reference from the candidate driving lane 408 to the destination based on the lowest cost path. That is, path 318 may represent the lowest cost path from the candidate driving lane 408 to the destination. Based on the path 318, the vehicle may generate a lane reference 414 (e.g., optimized trajectory) that extends from the candidate driving lane 408 to the destination. That is, the lane reference 414 may be the optimized trajectory that extends to the destination. Additionally, the vehicle 402 may identify a lowest cost path from the candidate driving lane 410 to the destination and generate a lane reference from the candidate driving lane 410 to the destination based on the lowest cost path. That is, path 416 (or preferred path) may represent the lowest cost path from the candidate driving lane 410 to the destination. Based on the path 416, the vehicle may generate a lane reference 418 (e.g., optimized trajectory) that extends from the candidate driving lane to the destination. That is, the lane reference 418 may be the optimized trajectory that extends to the destination. In some examples, the vehicle may include data shown and described herein as part of the local graph. That is, the local graph may include the boundary 404, the junction, the candidate driving lanes, the lowest cost paths, and/or the lane references. In such cases, one or more systems of the vehicle may use the local graph to determine actions for the vehicle to follow.

Figure 5:
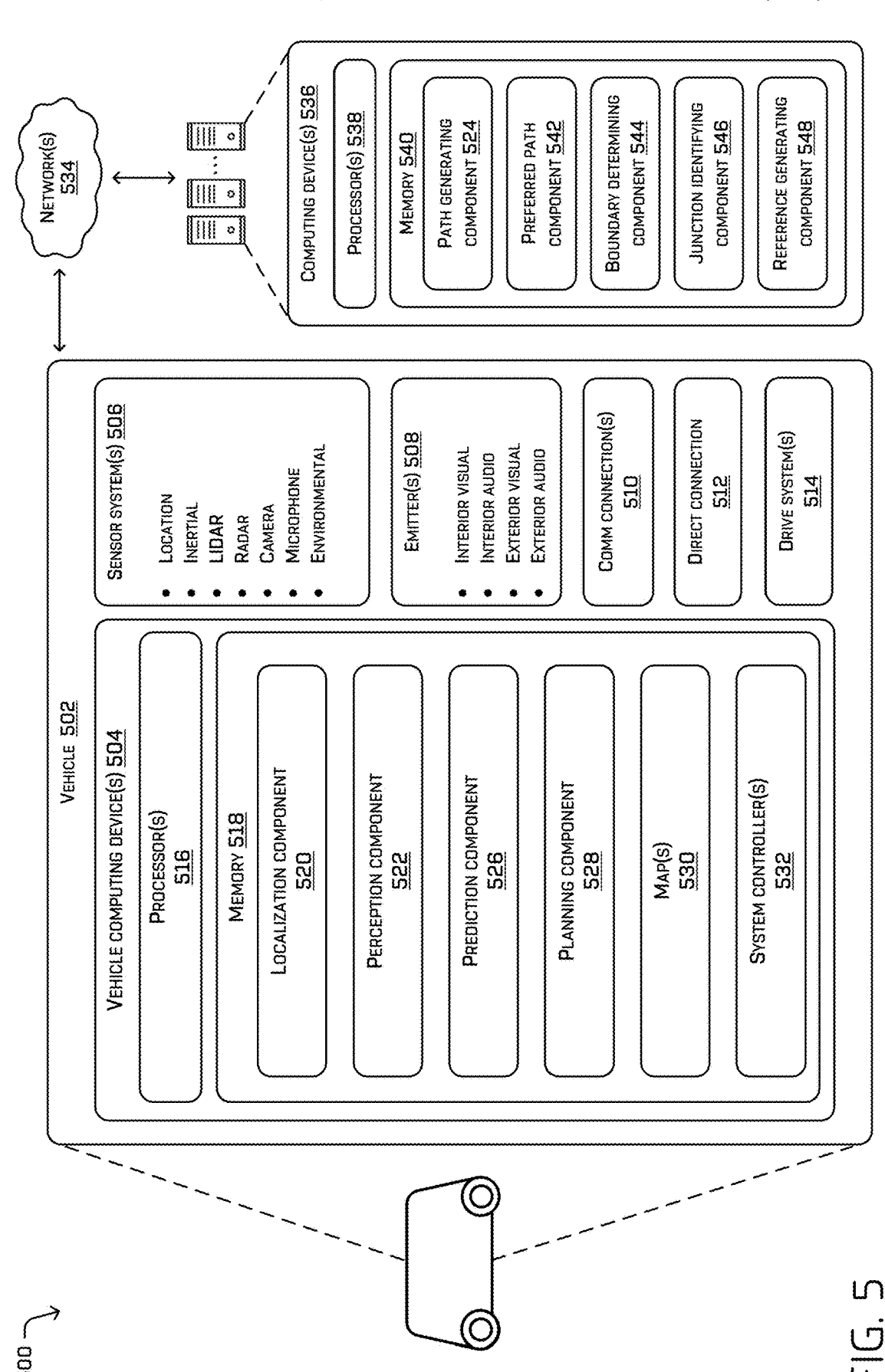
FIG. 5 depicts a block diagram of an example system for implementing various techniques described herein.

FIG. 5 is a block diagram of an example system 500 for implementing the techniques described herein. In at least one example, the system 500 may include a vehicle, such as vehicle 502. The vehicle 502 may include one or more vehicle computing devices 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the processor(s) 516. In the illustrated example, the vehicle 502 is an autonomous vehicle; however, the vehicle 502 could be any other type of vehicle, such as a semi-autonomous vehicle, or any other system having at least an image capture device (e.g., a camera-enabled smartphone). In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification.

In the illustrated example, the memory 518 of the vehicle computing device 504 stores a localization component 520, a perception component 522, a prediction component 526, a planning component 528, one or more system controllers 532, and one or more maps 530 (or map data). Though depicted in FIG. 5 as residing in the memory 518 for illustrative purposes, it is contemplated that the localization component 520, the perception component 522, the prediction component 526, the planning component 528, system controller(s) 532, and/or the map(s) may additionally, or alternatively, be accessible to the vehicle 502 (e.g., stored on, or otherwise accessible by, memory remote from the vehicle 502, such as, for example, on memory 540 of one or more computing device 536 (e.g., a remote computing device)). In some examples, the memory 540 may include a path generating component 524, a preferred path component 542, a boundary determining component 544, a junction identifying component 546, and/or a reference generating component 548.

In at least one example, the localization component 520 may include functionality to receive sensor data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530, and may continuously determine a location and/or orientation of the vehicle 502 within the environment. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 502. In some instances, the localization component 520 may provide data to various components of the vehicle 502 to determine an initial position of the vehicle 502 for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 526 may generate one or more probability maps representing prediction probabilities of possible locations of one or more objects in an environment. For example, the prediction component 526 may generate one or more probability maps for vehicles, pedestrians, animals, and the like within a threshold distance from the vehicle 502. In some instances, the prediction component 526 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 526 may generate predicted trajectories of objects (e.g., objects) in an environment. For example, the prediction component 526 may generate one or more predicted trajectories for objects within a threshold distance from the vehicle 502. In some examples, the prediction component 526 may measure a trace of an object and generate a trajectory for the object based on observed and predicted behavior.

In general, the planning component 528 may determine a path for the vehicle 502 to follow to traverse through an environment. For example, the planning component 528 may determine various routes and trajectories and various levels of detail. For example, the planning component 528 may determine a route to travel from a first location (e.g., a current location) to a second location (e.g., a target location). For the purpose of this discussion, a route may include a sequence of waypoints for travelling between two locations.

As non-limiting examples, waypoints include streets, intersections, global positioning system (GPS) coordinates, etc. Further, the planning component 528 may generate an instruction for guiding the vehicle 502 along at least a portion of the route from the first location to the second location. In at least one example, the planning component 528 may determine how to guide the vehicle 502 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 528 may select a trajectory for the vehicle 502.

In other examples, the planning component 528 may alternatively, or additionally, use data from the localization component 520, the perception component 522, and/or the prediction component 526 to determine a path for the vehicle 502 to follow to traverse through an environment. For example, the planning component 528 may receive data (e.g., object data) from the localization component 520, the perception component 522, and/or the prediction component 526 regarding objects associated with an environment. In some examples, the planning component 528 receives data for relevant objects within the environment. Using this data, the planning component 528 may determine a route to travel from a first location (e.g., a current location) to a second location (e.g., a target location) to avoid objects in an environment. In at least some examples, such a planning component 528 may determine there is no such collision-free path and, in turn, provide a path that brings vehicle 502 to a safe stop avoiding all collisions and/or otherwise mitigating damage. The planning component 528 may perform any of the techniques described with respect to any of FIGS. 1-4 above with respect to generating local graph data enabling a vehicle include dynamic routing functionality.

In at least one example, the vehicle computing device 504 may include one or more system controllers 532, which may be configured to control steering, propulsion, braking, safety, emitters, communication, and other systems of the vehicle 502. The system controller(s) 532 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 526, and/or the planning component 528 to determine a location of the vehicle 502, detect objects in an environment, generate routes, determine actions and/or trajectories to navigate within an environment.

In some examples, the one or more maps 530 may be stored on a remote computing device(s) (such as the computing device(s) 536) accessible via network(s) 534. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

In some instances, aspects of some or all of the components discussed herein may include any models, techniques, and/or machine-learned techniques. For example, in some instances, the components in the memory 518 (and the memory 540, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., sec U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 534, to the one or more computing device(s) 536 at a particular frequency, after a lapse of a predetermined period of time, in near real-time, etc.

The vehicle 502 may also include one or more emitters 508 for emitting light and/or sound. The emitter(s) 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device 536, other nearby vehicles, etc.) and/or one or more remote sensor system(s) for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 534. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the prediction component 526, the planning component 528, the one or more system controllers 532, and the one or more maps 530 may process sensor data, as described above, and may send their respective outputs, over the one or more network(s) 534, to the computing device(s) 536. In at least one example, the localization component 520, the perception component 522, the prediction component 526, the planning component 528, the one or more system controllers 532, and the one or more maps 530 may send their respective outputs to the computing device(s) 536 at a particular frequency, after a lapse of a predetermined period of time, in near real-time, etc.

In some examples, the vehicle 502 may send sensor data to the computing device(s) 536 via the network(s) 534. In some examples, the vehicle 502 may receive sensor data from the computing device(s) 536 and/or remote sensor system(s) via the network(s) 534. The sensor data may include raw sensor data and/or processed sensor data and/or representations of sensor data. In some examples, the sensor data (raw or processed) may be sent and/or received as one or more log files.

The computing device(s) 536 may include processor(s) 538 and a memory 540, which may include a path generating component 524, a preferred path component 542, a boundary determining component 544, a junction identifying component 546, and/or a reference generating component 548. In some examples, the memory 540 may store one or more of components that are similar to the component(s) stored in the memory 518 of the vehicle 502. In such examples, the computing device(s) 536 may be configured to perform one or more of the processes described herein with respect to the vehicle 502. In some examples, the path generating component 524, the preferred path component 542, the boundary determining component 544, the junction identifying component 546, and/or the reference generating component 548 may perform substantially similar functions as the planning component 528.

The processor(s) 516 of the vehicle 502 and the processor(s) 538 of the computing device(s) 536 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 540 are examples of non-transitory computer-readable media. The memory 518 and memory 540 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

FIG. 6 is a flow diagram illustrating an example process 600 for receiving a destination, receiving a preferred path based on the destination, determining a boundary, identifying a junction within the boundary, generating lane reference(s) for driving lane(s) associated with the junction, generating a local graph based on the boundary, driving lane(s), and/or the lane reference(s), and/or controlling the vehicle based on the local graph. As described below, the example process 600 may be performed by one or more computer-based components configured to implement various functionalities described herein. For instance, process 600 may be performed by a planning component 202. As described above, the planning component 202 may be integrated as an on-vehicle system in some examples. However, in other examples, the planning component 202 may be integrated as a separate server-based system.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 602, the planning component may receive a destination associated with an environment. The vehicle may receive instruction(s) (e.g., transport passenger(s), deliver item(s), etc.) to navigate from a starting location to an ending location (or destination). Such instruction(s) may be received from a fleet management system, a remote operating system, a passenger or a passenger device, a future passenger, and/or any other source. In some examples, a destination may be a location within the environment to which the vehicle is to navigate. That is, the instructions may include a location (e.g., x-y coordinate, street address, etc.) within the environment associated with a destination.

At operation 604, the planning component may receive a preferred path for a vehicle to follow to the destination. A preferred path may be a lowest cost path from the location of the vehicle to the destination. Based on receiving the destination, the planning component may determine the lowest cost path from some or all positions in the environment to the destination. That is, the planning component may solve for (or otherwise determine) the lowest cost path to the destination for each position (or a subset of positions) in the environment. A path may be a spatial representation of potential movements of the vehicle. The path may span one or more longitudinally connected road segments (e.g., multiple driving lanes of the same length traveling in the same direction). In some examples, the planning component may receive map data and identify the destination within the map data. Further, for every location in the map data, the planning component may compute the lowest cost path from the location to the destination. Accordingly, upon performing the shortest path algorithm for each location in the map data, the planning component may store such paths in a database associated with the vehicle. The database may be accessible to the vehicle such that the vehicle can retrieve one or more of the paths stored therein while navigating the environment. In some cases, the planning component may determine a location of the vehicle based on vehicle position data and retrieve, from the database, the lowest cost path from the location of the vehicle to the destination. The path retrieved from the database may be considered the preferred path.

At operation 606, the planning component may determine a local boundary that defines a region of the environment based on the preferred path. The boundary (or local boundary, local search boundary, etc.) may represent the region within the environment that the planning component may evaluate for dynamic routing. The boundary may define the bounds that expand a distance along the preferred path in front of the vehicle and a distance along the preferred path behind the vehicle. That is, the boundary may encompass the vehicle. The purpose of defining the boundary to encompass the vehicle is to allow remote operating systems to be able to guide or otherwise instruct the vehicle through the environment in situations in which the vehicle is to reverse. In some examples, the distance in front of the vehicle and/or the distance behind the vehicle may be static (or predefined). For example, the planning component may receive data indicating that the boundary may extend 250 meters in front of the vehicle and 30 meters behind the vehicle. Of course, in other examples, the distance(s) may be the same or different (e.g., larger or smaller). Alternatively, the distance(s) may be dynamically determined (e.g., the distance(s) are modified or updated while the vehicle navigates the environment). For example, the planning component may determine an updated size and/or dimension of the boundary based on one or more factors. Such factors may include a speed limit of the road segment, driving lane, etc. or a type of the driving lane (e.g., freeway (e.g., larger distances), inner city (e.g., smaller distances), etc.).

At operation 608, the planning component may identify a junction within the local boundary and along the preferred path. A junction (or intersection) may be a location where two or more driving lane(s) (or road segments, lane segments, etc.) intersect or diverge. The planning component may identify the junction(s) within the boundary by accessing map data associated with the environment within the boundary and identifying one or more junctions. In some cases, the map data may tag or otherwise indicate the junctions within the map data. As such, the planning component may identify the junctions based on the tagged map data.

At operation 610, the planning component may determine whether the junction was located in a previous local graph. That is, the planning component may update and/or generate local graphs while the vehicle navigates through the environment. As such, the planning component may store previous local graphs (and the data associated thereto) in a database and/or cache memory. As such, the planning component may compare the junction with junctions in previous local graphs to determine whether the junction is new to the local graph. That is, if the junction is not located in the previous local graph (610: No), the planning component may generate the data associated thereto. At operation 612, the planning component may identify a candidate driving lane associated with the junction. That is, the planning component may identify the driving lanes that exit the junction. For example, if the junction is a four-way junction, the planning component may identify the three other driving lanes that exit the junction as the candidate driving lanes. The planning component may identify the candidate driving lanes by accessing and/or analyzing the map data.

At operation 614, the planning component may generate lane reference associated with the candidate driving lane. In some examples, the planning component may identify a lowest cost path associated with the candidate driving lane and generate lane reference according to the lowest cost path. That is, the planning component may use or otherwise access the database described above to retrieve the lowest cost paths for the candidate driving lanes. In such cases, the planning component may identify a position within the environment that the driving lane (or road segment associated with the candidate driving lane) starts (or exists the junction). Based on identifying the position of the driving lane, the planning component may access the database and identify the lowest cost path that starts at the same location as the position of the driving lane. The planning component may perform such operations for some or all driving lanes within the boundary. For example, if the junction includes two candidate driving lanes, the planning component may identify a first location for the first candidate driving lane and a second location of the second driving lane. The planning component may use the first location to retrieve a first lowest cost path for the first candidate driving lane and use the second location to retrieve a second lowest cost path for the second candidate driving lane.

Based on receiving the lowest cost path(s) for the candidate driving lane(s), the planning component may generate a lane reference along the lowest cost path (or path) that extends from the start of the candidate driving lane to the destination. That is, based on identifying a lowest cost path for all of the candidate driving lanes, the planning component may determine a lane reference along each of the lowest cost paths. A lane reference may be an optimized trajectory (e.g., includes spatial, temporal, and kinematic data) that the vehicle may follow. In some examples, the planning component may use one or more machine-learning models to generate the lane reference(s). The machine-learning model may receive, as input, road segment data, driving lane data, lane segment data, etc. and output a lane reference.

At operation 616, the planning component may generate a local graph based on the local boundary, candidate driving lane, and the lane reference. That is, the planning component may combine the abovementioned data into a data structure which may be used and analyzed by downstream systems.

In contrast, if the junction is located in the previous local graph (610: No), the planning component may retrieve the data associated with the junction (e.g., candidate driving lanes, lowest cost paths of such candidate driving lanes, lane references associated with the candidate driving lanes, etc.) from a database. That is, at operation 618, the planning component may retrieve junction data (e.g., candidate driving lanes, lowest cost paths of such candidate driving lanes, lane references associated with the candidate driving lanes, etc.) from a database. As noted above, the planning component may store previous local graphs. As such, the planning component may retrieve data associated with the junction from a previous version of the local graph.

At operation 620, the planning component may generate a local graph based on the local boundary and the junction data. The planning component may include the local boundary and the junction data in the local graph. Retrieving the junction data may save processing resources.

At operation 622, the planning component may control the vehicle based on the local graph. Based on generating the local graph, the planning component may control the vehicle based on the local graph. That is, upon generating the local graph, the planning component may send the local graph to one or more downstream prediction and/or planning components which may use and/or build upon the data stored in or otherwise associated with the local graph. As such, such systems may use the local graph to generate actions for the vehicle to follow which may result in the vehicle being controlled based on the local graph.

Example Clauses

A: A system comprising: one or more processors; and one or more non-transitory computer-readable media storing computer-executable instructions that, when executed, cause the system to perform operations comprising: receiving a destination associated with an environment; receiving a preferred path for a vehicle to follow to the destination; generating, based at least in part on the preferred path, a local graph, wherein generating the local graph is based at least in part on: determining a region of the environment; identifying, based at least in part on map data, a junction within the region; identifying a candidate driving lane associated with the junction; receiving a candidate path from the candidate driving lane to the destination; and controlling the vehicle based at least in part on the local graph.

B: The system of paragraph A, wherein the candidate path is at least one of: a lowest cost path from the candidate driving lane to the destination, or a trajectory for the vehicle to use to navigate to the destination.

C: The system of paragraph A, wherein determining the local graph is based at least in part on: receiving the map data associated with the environment; identifying a position of the vehicle in the map data; determining a plurality of candidate driving lanes associated with the junction; and determining a plurality of lowest cost paths associated with the plurality of candidate driving lanes.

D: The system of paragraph A, wherein the region extends a first distance in front of the vehicle and a second distance behind the vehicle, wherein the first distance is larger than the second distance.

E: The system of paragraph D, wherein the first distance and the second distance are determined based at least in part on: a speed limit associated with a driving lane within the region, or a type of driving lane.

F: One or more non-transitory computer-readable media storing instructions executable by one or more processors, wherein the instructions, when executed, cause a system to perform operations comprising: receiving a destination associated with an environment; receiving a preferred path for a vehicle to follow to the destination; generating a local graph based at least in part on: determining a region of the environment proximate the vehicle; determining a junction within the region; determining a plurality of candidate driving lanes associated with the junction; and determining, for a candidate driving lane of the plurality of candidate driving lanes, a candidate path to the destination when following the candidate driving lane; and controlling the vehicle based at least in part on the local graph.

G: The one or more non-transitory computer-readable media of paragraph F, wherein the candidate path is at least one of: a lowest cost path from the candidate driving lane to the destination, or a trajectory for the vehicle to use to navigate to the destination.

H: The one or more non-transitory computer-readable media of paragraph F, wherein determining the local graph is based at least in part on: receiving map data associated with the environment; identifying a position of the vehicle in the map data; and determining a plurality of lowest cost paths associated with the plurality of candidate driving lanes.

I: The one or more non-transitory computer-readable media of paragraph F, wherein the region extends a first distance in front of the vehicle and a second distance behind the vehicle.

J: The one or more non-transitory computer-readable media of paragraph I, wherein the first distance is determined based at least in part on: a speed limit associated with a driving lane within the region, or a type of driving lane.

K: The one or more non-transitory computer-readable media of paragraph F, wherein controlling the vehicle based on the local graph comprises: determining that the preferred path includes an obstruction; identifying, based at least in part on the obstruction and a cost associated with the candidate path, the candidate driving lane from the local graph; and controlling the vehicle based at least in part on the candidate driving lane.

L: The one or more non-transitory computer-readable media of paragraph F, wherein the local graph is a first local graph, the operations further comprising: generating, based at least in part on a movement of the vehicle after the first local graph was generated, a second local graph that is associated with a second region of the environment that is different than the region of the environment covered by the first local graph.

M: The one or more non-transitory computer-readable media of paragraph L, wherein generating the second local graph is based at least in part on: identifying a second junction within the second region; determining that the second junction is located within the first local graph; and receiving, from a database and based at least in part on the second junction being located within the first local graph, candidate driving lane data, candidate path data, and trajectory data associated with the second junction.

N: A method comprising: receiving a destination associated with an environment; receiving a preferred path for a vehicle to follow to the destination; generating a local graph based at least in part on: determining a region of the environment proximate the vehicle; determining a junction within the region; determining a plurality of candidate driving lanes associated with the junction; and determining, for a candidate driving lane of the plurality of candidate driving lanes, a candidate path to the destination when following the candidate driving lane; and controlling the vehicle based at least in part on the local graph.

O: The method of paragraph N, wherein the candidate path is at least one of: a lowest cost path from the candidate driving lane to the destination, or a trajectory for the vehicle to use to navigate to the destination.

P: The method of paragraph N, wherein determining the local graph is based at least in part on: receiving map data associated with the environment; identifying a position of the vehicle in the map data; and determining a plurality of lowest cost paths associated with the plurality of candidate driving lanes.

Q: The method of paragraph N, wherein the region extends a first distance in front of the vehicle and a second distance behind the vehicle.

R: The method of paragraph Q, wherein the first distance is determined based at least in part on: a speed limit associated with a driving lane within the region, or a type of driving lane.

S: The method of paragraph N, wherein controlling the vehicle based on the local graph comprises: determining that the preferred path includes an obstruction; identifying, based at least in part on the obstruction and a cost associated with the candidate path, the candidate driving lane from the local graph; and controlling the vehicle based at least in part on the candidate driving lane.

T: The method of paragraph N, wherein the local graph is a first local graph, further comprising: generating, based at least in part on a movement of the vehicle after the first local graph was generated, a second local graph that is associated with a second region of the environment that is different than the region of the environment covered by the first local graph.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the system to perform operations comprising:
receiving a destination associated with an environment;
receiving a preferred path for a vehicle to follow to the destination;
generating, based at least in part on the preferred path, a local graph, wherein generating the local graph is based at least in part on:
determining a region of the environment;
identifying, based at least in part on map data, a junction within the region;
identifying a candidate driving lane associated with the junction; and
receiving, from a database that stores a plurality of lowest cost paths to a destination from different locations within the environment, a candidate path from the candidate driving lane to the destination; and
controlling the vehicle based at least in part on the local graph.

2. The system of claim 1, wherein the candidate path is at least one of:
a lowest cost path from the candidate driving lane to the destination, or
a trajectory for the vehicle to use to navigate to the destination.

3. The system of claim 1, wherein determining the local graph is based at least in part on:
receiving the map data associated with the environment;
identifying a position of the vehicle in the map data;
determining a plurality of candidate driving lanes associated with the junction; and
determining a plurality of lowest cost paths associated with the plurality of candidate driving lanes.

4. The system of claim 1, wherein the region extends a first distance in front of the vehicle and a second distance behind the vehicle, wherein the first distance is larger than the second distance.

5. The system of claim 4, wherein the first distance and the second distance are determined based at least in part on:
a speed limit associated with a driving lane within the region, or
a type of driving lane.

6. One or more non transitory computer readable media storing instructions executable by one or more processors, wherein the instructions, when executed, cause a system to perform operations comprising:
receiving a destination associated with an environment;
receiving a preferred path for a vehicle to follow to the destination;
generating a local graph based at least in part on:
determining a region of the environment proximate the vehicle;
determining a junction within the region;
determining a plurality of candidate driving lanes associated with the junction; and
determining, for a candidate driving lane of the plurality of candidate driving lanes and from a database that stores a plurality of lowest cost paths to a destination from different locations within the environment, a candidate path to the destination when following the candidate driving lane; and
controlling the vehicle based at least in part on the local graph.

7. The one or more non transitory computer readable media of claim 6, wherein the candidate path is at least one of:
a lowest cost path from the candidate driving lane to the destination, or
a trajectory for the vehicle to use to navigate to the destination.

8. The one or more non transitory computer readable media of claim 6, wherein determining the local graph is based at least in part on:
receiving map data associated with the environment;
identifying a position of the vehicle in the map data; and
determining a plurality of lowest cost paths associated with the plurality of candidate driving lanes.

9. The one or more non transitory computer readable media of claim 6, wherein the region extends a first distance in front of the vehicle and a second distance behind the vehicle.

10. The one or more non transitory computer readable media of claim 9, wherein the first distance is determined based at least in part on:
a speed limit associated with a driving lane within the region, or
a type of driving lane.

11. The one or more non transitory computer readable media of claim 6, wherein controlling the vehicle based on the local graph comprises:
determining that the preferred path includes an obstruction;
identifying, based at least in part on the obstruction and a cost associated with the candidate path, the candidate driving lane from the local graph; and
controlling the vehicle based at least in part on the candidate driving lane.

12. The one or more non transitory computer readable media of claim 6, wherein the local graph is a first local graph, the operations further comprising:

generating, based at least in part on a movement of the vehicle after the first local graph was generated, a second local graph that is associated with a second region of the environment that is different than the region of the environment covered by the first local graph.

13. The one or more non transitory computer readable media of claim 12, wherein generating the second local graph is based at least in part on:

identifying a second junction within the second region;

determining that the second junction is located within the first local graph; and receiving, from a database and based at least in part on the second junction being located within the first local graph, candidate driving lane data, candidate path data, and trajectory data associated with the second junction.

14. A method comprising:

receiving a destination associated with an environment;

receiving a preferred path for a vehicle to follow to the destination;

generating a local graph based at least in part on:

determining a region of the environment proximate the vehicle;

determining a junction within the region;

determining a plurality of candidate driving lanes associated with the junction; and determining, for a candidate driving lane of the plurality of candidate driving lanes and from a database that stores a plurality of lowest cost paths to a destination from different locations within the environment, a candidate path to the destination when following the candidate driving lane; and controlling the vehicle based at least in part on the local graph.

15. The method of claim 14, wherein the candidate path is at least one of:

a lowest cost path from the candidate driving lane to the destination, or a trajectory for the vehicle to use to navigate to the destination.

16. The method of claim 14, wherein determining the local graph is based at least in part on:

receiving map data associated with the environment;

identifying a position of the vehicle in the map data; and determining a plurality of lowest cost paths associated with the plurality of candidate driving lanes.

17. The method of claim 14, wherein the region extends a first distance in front of the vehicle and a second distance behind the vehicle.

18. The method of claim 17, wherein the first distance is determined based at least in part on:

a speed limit associated with a driving lane within the region, or a type of driving lane.

19. The method of claim 14, wherein controlling the vehicle based on the local graph comprises:

determining that the preferred path includes an obstruction;

identifying, based at least in part on the obstruction and a cost associated with the candidate path, the candidate driving lane from the local graph; and controlling the vehicle based at least in part on the candidate driving lane.

20. The method of claim 14, wherein the local graph is a first local graph, further comprising:

generating, based at least in part on a movement of the vehicle after the first local graph was generated, a second local graph that is associated with a second region of the environment that is different than the region of the environment covered by the first local graph.

* * * * *